United States Patent [19]

Raguenet

[11] Patent Number: 5,248,980
[45] Date of Patent: Sep. 28, 1993

[54] SPACECRAFT PAYLOAD ARCHITECTURE

[75] Inventor: Gérard Raguenet, Eaunes, France

[73] Assignee: Alcatel Espace, Courbevoie, France

[21] Appl. No.: 863,075

[22] Filed: Apr. 3, 1992

[30] Foreign Application Priority Data

Apr. 5, 1991 [FR] France .................. 91 04172

[51] Int. Cl.$^5$ ............................................. H04B 7/185
[52] U.S. Cl. .................................................. 342/354
[58] Field of Search ............... 342/352, 353, 354, 368, 342/371

[56] References Cited

U.S. PATENT DOCUMENTS

| | | | |
|---|---|---|---|
| 4,236,161 | 11/1980 | Ohm | 343/781 CA |
| 4,868,886 | 9/1989 | Assal et al. | 342/354 |
| 4,965,588 | 10/1990 | Lenormand | 342/372 |

OTHER PUBLICATIONS

1990 International Symposium Digest Antennas and Propagation vol. IV, May 1990, Dallas, US, pp. 1896–1899; Lo Forti et al.: "Performance Evaluation of a Near Field Fed Double Curvature Reflector".

IEEE Global Telecommunications Conference and Exhibition, Conference Record vol. 2, Nov. 1989, Dallas, US, pp. 1115–1119; Bartolucci et al.: "A Multibeam Active Antenna for a European Contiguous Coverage at Ku-Band".

1988 International Symposium Digest Antennas and Propagation vol. 2, Jun. 1988, Syracuse, US, pp. 502–505; Lenormand et al.: "A Versatile Array Fed Reflector Antenna Part A—Reception".

International Antenna and Propagation Symposium, Digest and Technical Program, Oct. 1976, Piscataway, US, pp. 117–120; Brumbaugh et al.: "Shaped Beam Antenna for the Global Positioning Satellite System".

1989 International Symposium Digest Antennas and Propagation vol. I, Jun. 1989, San Jose, US, pp. 400–403; Mailloux et al.: "Statistically Thinned Arrays with Quantitized Amplitude Weights".

Primary Examiner—Gregory C. Issing
Attorney, Agent, or Firm—Sughrue, Mion, Zinn, Macpeak & Seas

[57] ABSTRACT

Spacecraft payload architecture which includes an array (10) of radiating elements preceded by an amplification stage (17) and a focusing optical system (11), characterized in that the architecture is adapted to a telecommunication mission by taking into account the overall requirements of the system, namely the radiation performance required for the mission, efficient rating of the amplification stage and attractive overall balances.

7 Claims, 3 Drawing Sheets

SPACECRAFT PAYLOAD ARCHITECTURE

BACKGROUND OF THE INVENTION

The present invention concerns a spacecraft payload architecture.

The design and specification of "space segment" telecommunication payloads are evolving in line with operator requirements reflected by the "explosion" in data communications, the development of direct and semi-direct TV broadcast systems, communications with air, land and sea mobiles, etc.

Unlike systems of previous generations, new systems must provide for a number of features directed to improving the management of the satellite's "onboard" resources such as —multi-beam operation; reconfigurable coverage zones, flexibility of addressing the RF (Radio Frequency) output power to different beams, EIRP (Equivalent Isotropic Radiated Power) reconfigurability.

These features go hand in hand with expected improvements in transmission systems, such as increased transmit EIRP, increasingly high receive G/T factor of merit, and radiated beam quality including: beam shaping: (severe template,) isolation areas, and high directivity.

Specifying the optimum payload for a given mission requires a rigorous review of all potential antenna solutions to develop the best possible system.

Conventional transparent repeater architectures do not offer satisfactory response in the context of multibeam operation with instantaneous power reconfigurability, a concept which has attracted considerable research effort over the last decade.

The natural expression of total instantaneous power reconfigurability is the phased array. The antenna system representing the best response to this problem is essentially the direct radiating array using strictly the same amplitude law to generate any spot where the only control which is then applied is phase control. In a system of this kind, the amplifier rating is immediately apparent and their operation is optimized because there is no differential demand between the different spots, i.e., the amplitude laws are identical. The drawback of this type of approach is its intrinsic complexity if significant directivity is required. The maximum size of the basic components is determined by the array lobe criterion. A large number of unit sources involves a large number of control points and therefore as many amplifiers as there are channels at the beam forming level.

Overall payload budgets often rule out direct radiating arrays when the aperture required is several tens of wavelengths. The result is all the more marked for apertures of more than one hundred times the wavelengths which are routinely used in telecommunication applications employing very high gain. It is therefore beneficial to obtain the gain parameter using a wide aperture where a reflector (or lens) is illuminated by a primary source whose complexity depends on the mission.

Here again there are two feasible concepts, distinguished by whether or not they use a Fourier transform.

The first concept is to dispose the feeds in the focal plane of a focussing system. In this case the beams are generated by carefully managing the amplitude and the phase of each feed. A concept of this kind is described in the article "A versatile array reflector antenna: part A - Reception" by R. Lenormand, E. El Shirbini, J. Neron, J. P. Marre, B. Vidal Saint André, R. Coirault and E. Rammos (SIO/IEEE/002-88). This concept has a number of inherent advantages. It offers very high synthesis efficiency and requires a minimal number of feeds (this is characteristic of focused systems).

The use of a focusing optical system offers a number of advantages in terms of antenna performance (synthesis quality, high yield, minimal number of feeds with repercussions on the rating, overall dimensions, mass and power consumption of active and control systems). However, the optical system is in a plane where reconfigurability is poor which introduces a major problem with amplifier ratings where an equal-amplitude condition characteristic of phased array operation ensuring good reconfigurability is required in the amplifier plane. This is achieved, broadly speaking, by applying a second Fourier transform to change from a distribution characteristic of a diffraction spot to an equal-amplitude distribution.

The reconfigurability requirement and the rating of the payload therefore impose the use of a Butler matrix or a generalized coupler which must be included in all balances (mass/overall dimensions/dissipation/losses, etc).

A second concept starts from the idea that two same-focus reflectors are equivalent to a double spatial Fourier transform. This approach is behind the implementation of imaging arrays as described in "Limited electronic scanning with an offset-feed near-field gregorian system" by W. D. Fitzgerald (Technical report 486; Sep. 24, 1971, Massachusetts Institute of Technology Lincoln laboratory).

A structure of this kind is complex for use on a satellite. One of the two reflectors is dispensed with and a non-focusing surface is employed for the main reflector which illuminates a primary array as uniformly as possible. In a device of this kind, theory indicates that only the phase has to be controlled to generate spots in the required areas; all of the radiating elements are energized under equal-amplitude conditions. This mode of operation introduces certain radio frequency design constraints such as an uprated reflector by 25 to 40% as compared to a parabolic reflector), and a large array because it is far away from the "focal plane" on its upstream or downstream side.

From the antenna point of view, the second concept raises two problems. The first problems relates to average synthesis quality because only the phase is controlled and reduced efficiency (35 to 45%) because of the radiation lost in the lobes of the array. The second problem relates to large number and uprating of control elements; this represents a penalty with respect to the mass performance.

This solution is attractive in terms of system budgets because its reconfigurability allows poor antenna performance to be compensated by efficient rating of the amplifiers. The evaluation of the continuous power to produce a given EIRP is the concept which is of benefit in budget terms.

SUMMARY OF THE INVENTION

An object of the present invention is to provide an elegant response to the requirements of a telecommunication mission to transmit without encountering the problems of these various solutions, including a focused solution reconfigurability is poor which means that a highly complex matrix technology must be used, and an imager reflector solution the mass and the number of control points of which are both uprated.

The invention goes against both of these approaches, which raise problems and can even represent a dead end. The logic of the present approach is twofold: to find a system which guarantees antenna performance with good efficiency;

—has intrinsic reconfigurability.

To this end the invention proposes a space payload architecture including a telecommunication system comprising a feed array preceded by an amplification stage and a focusing optical system characterized in that the architecture is adapted to a telecommunication mission by taking into account all requirements of the system, namely radiation performance suited to the mission requirements, efficient rating of the amplification stage and attractive overall balances.

With this architecture it is possible to use only a limited number of feeds with intrinsic payload flexibility and an optimized combination of mass/power consumption/cost.

For each coverage zone of the mission, rather than addressing a limited number of feeds, a larger set of main feeds is advantageously addressed requiring high power levels. The main set of feeds is common to all the coverage zones, all these feeds have more or less the same power level. For finer synthesis of each coverage zone additional feeds at lower power levels are employed. The feeds which have the same amplitude and phase variations from one coverage zone to another are grouped together around a single control point. The feeds which contribute little to synthesis are ignored, accepting a limited loss as compared with the optimum synthesis.

Significant aberrations are therefore generated in the optical system.

These aberrations can be generated by depointing the boresight axis of the antenna relative to the set of coverage zones, or by using optical systems with a very low focal length/diameter ratio so that any off-axis radiation causes important amplitude and phase distortion at the focal spots or by using offset antenna configurations with a very high offset angle which is typically 60° to 90°, also a source of significant distortion.

BRIEF DESCRIPTION OF THE DRAWINGS

The features and advantages of the invention will emerge from the following description given by way of non-limiting, example with reference to the appended Figures in which.

DETAILED DESCRIPTION OF THE PREFERRED EMBODIMENT

Figure 1:
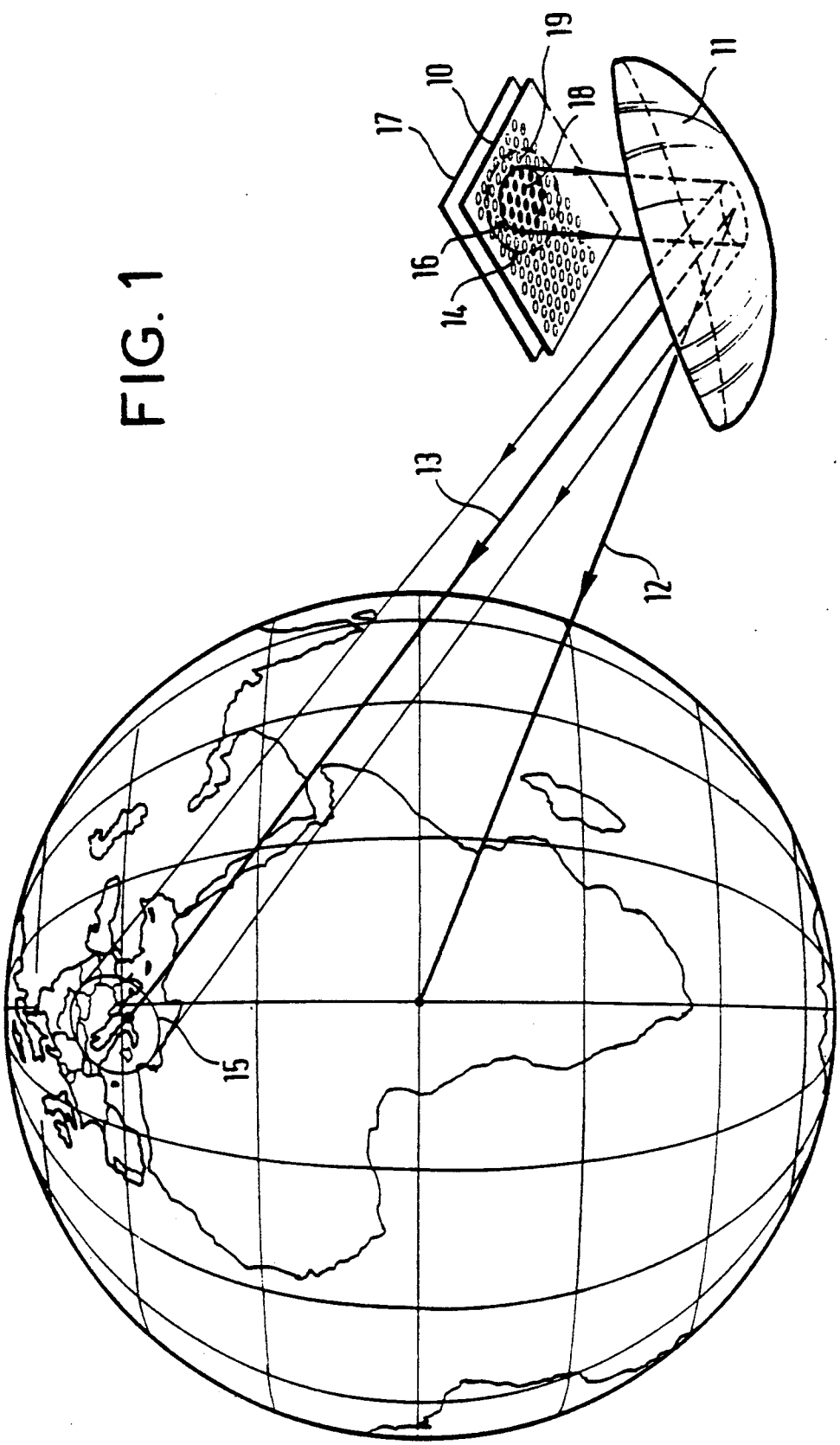
FIG. 1 is a schematic representation of a payload architecture in accordance with the present invention.

In the antenna system in accordance with the present invention shown in FIG. 1, which includes an array 10 of feeds or radiating elements preceded by an amplification stage 17 and an optical focusing system 11, such as a reflector, for example, significant aberration is deliberately generated in the optical system so that to obtain a coverage zone 15 in a given telecommunication mission, the system, unlike a purely focusing system, does not address a limited number of feeds, but overflows onto a larger set 16 of main feeds 18 which require high power levels common to all the coverage zones. For a finer synthesis additional feeds 19 are employed at lower power levels. The precision of the synthesis is therefore dependent on high, medium and low level elements. The aberrations may be generated by various means. The following may be mentioned by way of non-limiting example:

depointing of the boresight axis 12 of the antenna relative to the direction 13 of the set of coverage zones;

use of an optical system 11 with a very small focal length/diameter ratio so that any off-axis radiation causes significant amplitude and phase distortion at the focal spots;

using offset antenna configurations with a very high offset angle: typically 60° to 90°, which also generate high distortion.

Referring to FIG. 1, the increased set of feeds 14 (high, medium and possibly low levels) for the mission is disposed in a highly unfocused way relative to the focus F of the reflector 11 which is a strongly curved parabolic reflector.

The system is correctly rated if, for all the coverage zones to be generated, the various diffraction spots to be synthesized distribute the power in a balanced way between the feeds, meaning that the high feeds remain high (medium or low) for any spot. Obviously, it is not feasible to consider a power distribution that is strictly identical for all the coverage zones to be synthesized. A reduced dynamic range is tolerated with respect to the requirements of each feed. These dynamic ranges characterize a finer radio frequency synthesis because amplitude and phase control are retained to optimize the mission coverage.

When the antenna sub-system configuration has been set, the transmission payload rating is immediately evident and depends on the total power to be transmitted and on the EIRP flexibility required by the mission.

Various classes of amplifier have been defined (high, medium low gain). These amplifiers are optimized with respect to their operating point because they operate over a reduced dynamic range (1 to 2 dB) so that all of the payload is rated with a minimal back-off, which guarantees very high efficiency at the EIRP/continuous consumption balance irrespective of the traffic and reconfiguration requirement.

A configuration of this kind is of interest for more than one reason, and its advantages can be summarized to include excellent synthesis capacity, (phase and amplitude control) "free of charge" (no additional components) reconfiguration capability, and an optimized antenna sub-system including a reduced number of active elements, no array lobe problems, compact and easy to install solution, compact primary array and no uprating of array+reflector system, and finally easy rating of amplification stages and high payload efficiency.

The solution put forward by the invention takes account of overall system requirements from the outset. This solution based on the use of high aberration optical systems achieves an excellent overall compromise on lumping all balances together (mass, number of components, consumption, flexibility, complexity).

Figure 2:
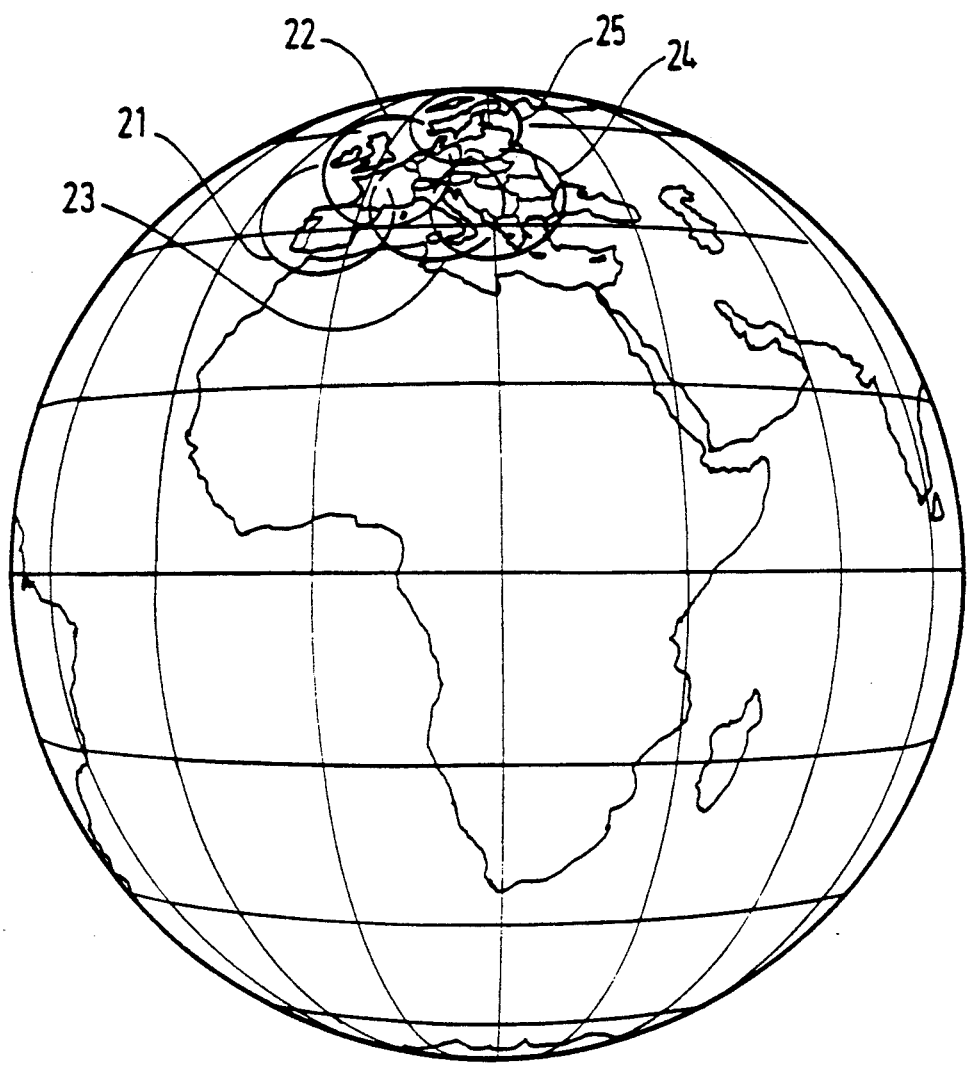
FIGS. 2 and 3 show one embodiment of the antenna system in accordance with the present invention.
Figure 3:
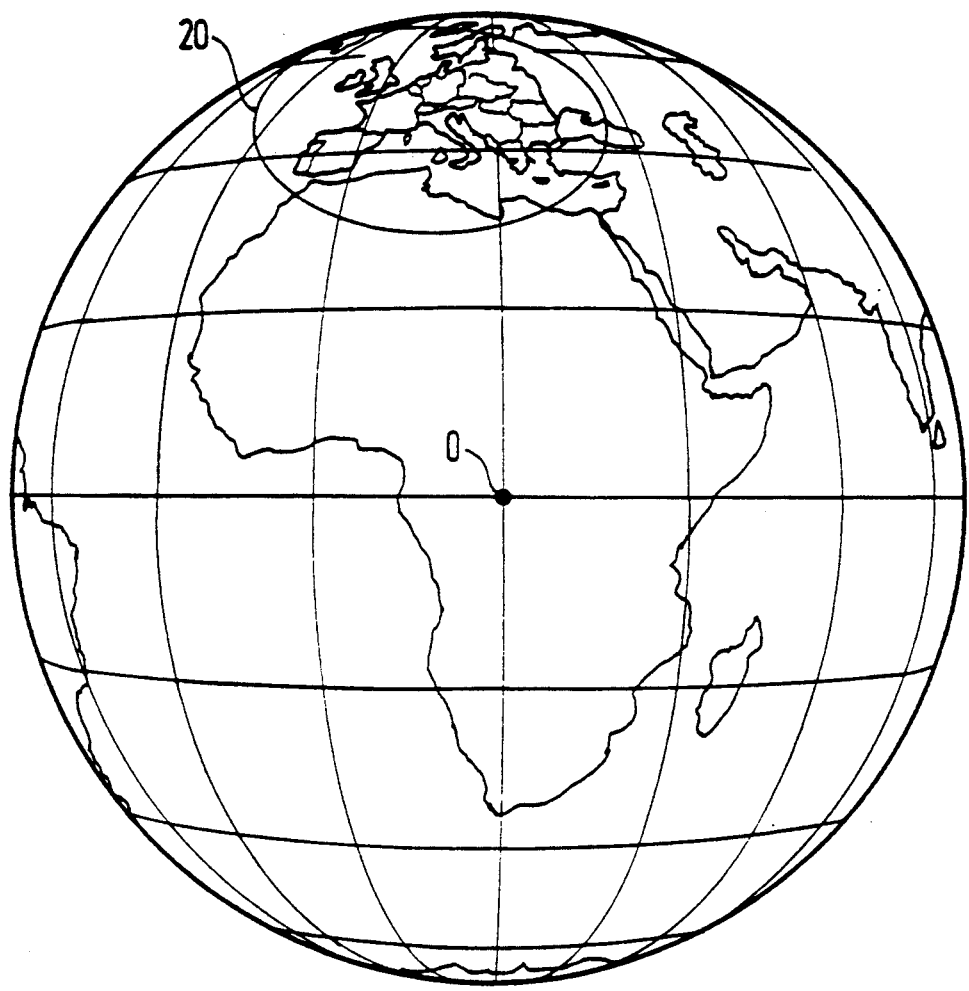

The embodiment described hereinafter concerns the rating of a transmission payload providing multispot European coverage. As shown in FIGS. 2 and 3, the mission requirement is to generate a wide European spot 20, and five "national" spots 21, 22, 23, 24 and 25.

The EIRP must be flexible and addressable to any beam within a specified dynamic range.

The solution at the antenna subsystem level consists in using a reflector geometry with a very small focal length/diameter ratio (around 0.35) associated with a set of feeds illuminating the reflector with a 90° inclination angle, and considering an antenna target point O deliberately off-center within the coverage zone such that the center of the European coverage zone is therefore in North Italy although the focal axis of the antenna is aimed at the sub-satellite point 0° North 20° East.

These two conditions are such that the system is operated in a way that contradicts received wisdom on antenna rating. This approach is the basis for the rating of the payload because it is the keystone of the instantaneous power reconfigurability.

The system proposed in this embodiment uses includes a reflector 4 meters in diameter with a focal length/diameter ratio of 0.35, that is a focal length of 1 400 mm and a set of 14 L-band (1.5 GHz) dipoles disposed in the focal plane. This primary feed architecture is the result of work on optimizing the retention or not of an additional peripheral element given the increase in antenna performance that it brings (contour tracking, isolation, gain in dB) and the impact of a large number of elements which increases the complexity of the system at payload level (mass of beam forming networks (BFN), SSPA amplifiers, filters, radiating panel, etc).

Initially it is necessary to bracket the solution by using a large number of feeds. A significant field spread is produced because of the aberrant optics. Initially the implementation uses an uprated number of radiating elements (30 in the case of the mission under consideration). Optimization software then establishes "reference" performances for the configuration.

As the problem of the number of control points of active antennas is crucial, the entire approach thereafter is to reduce the number of channels and therefore of SSPA and filters, producing attractive overall budgets.

Two methods are employed to achieve this reduction. One is the elimination of elements making little contribution to the synthesis accepting a limited loss compared with the optimal reference synthesis (typically 0.50 dB). The other method includes grouping elements having the same amplitude and phase variation from one spot to another around a single control point.

By way of example, table I at the end of this description sets out all results for the reference synthesis using the 30 basic elements, the level in dB being defined relative to the maximum level obtained. Some feeds obviously make a negligible contribution and can be eliminated such as feeds numbered 01, 02, 14, 15, 27, 28, 29, and 30, yielding a new distribution of 22 feeds.

It is also obvious from this table that a number of elements receive much more power than the others, irrespective of the spot in question, the feeds are numbered 11, 12, 16, 17, 18, 20, 21, and 22 constituting the central part of the array. It is because of this contrast spreading of the major part of the power over a common number of elements that reconfigurability is a natural feature of the system.

Further elements can also be eliminated, subject to verification by calculation such as the feeds numbered 04, 09, 10 and 19, reducing the number of radiating elements to 18.

Optimization has been taken even further to reduce the number of radiating elements to 18 and the number of independent control points to 12. Table II shows the final performance obtained for each of the spots synthesized using 14 feeds compared to the nominal performance obtained with 30 feeds. Note that the impact at RF is minor and does not exceed 0.50 dB.

FIGS. 2 and 3 show the coverage performance of the finalized configuration.

These results show the benefit of the configuration justifying its reconfigurability by a rating of an amplification stage.

A complete set of power distributions has been analyzed and is provided below.

The following seven distributions of a total power of 100 W were considered:
1. Global (76 W)+24 W to equi-distributed spots.
2. Global (50 W)+24 W to equi-distributed spots.
3. Global (76 W)+24 W to spot 21.
4. Global (76 W)+24 W to spot 22.
5. Global (76 W)+24 W to spot 23.
6. Global (76 W)+24 W to spot 24.
7. Global (76 W)+24 W to spot 25.

The calculation method starts with the set of optimization result coefficients to define the maximum power requirement for each control point according to different traffic scenarios, As a general rule 12 different numerical values result. It is a relatively simple matter to group these values in amplifier classes. In the present application this yields:
one 40 W amplifier,
one 30 W amplifier,
one 10 W amplifier,
five 6 W amplifiers,
four 2.5 W amplifiers.

The calculation for each distribution then analyzes the operating point of the amplifier relative to the maximum power, evaluating its efficiency for this precise point and so determining the continuous power required to deliver the RF power.

This calculation is done for the 12 amplifiers and after this it is possible to evaluate the reconfigurability of the system by comparing the continuous consumption and the overall yield.

Table III shows all analysis results based on yield losses of 0.50 dB/dB. The table shows the RF power required by each of 12 subgroups and the total consumption of the configuration for all traffic cases analyzed.

The results are striking and show unambiguously the capability of the system to integrate high traffic dynamic range without penalty as to the rating of the amplifier system (loss of yield due to traffic variation $\leq 0.40$ dB).

The configuration of the subsystem based on the use of a strongly defocused optical system therefore makes it possible to implement a multispot coverage using a limited number of active elements having performance capabilities near those of a focusing system having a small number of filters, control elements, and SSPA. This configuration also makes it possible to rate the set of amplifiers nominally without requiring complex systems such as generalized couplers or other diffusing matrices.

Of course, the present invention has been described and shown by way of preferred example only and its component parts may be replaced with equivalent component parts without departing from the scope of the invention.

TABLE I

| Source | Global (20) | Spain (21) | France (22) | Italy (23) | Greece (24) | Scandinavia (25) |
|---|---|---|---|---|---|---|
| 01 | −14.50 | — | — | — | −14.40 | −15.80 |
| 02 | −18.70 | — | — | — | −15.50 | −18.70 |
| 03 | −12.10 | — | −24.00 | −15.20 | −8.80 | −9.20 |
| 04 | −14.10 | −15.20 | −14.20 | −10.00 | −13.60 | −8.90 |
| 05 | −7.30 | — | — | — | −13.30 | — |
| 06 | −6.20 | −16.00 | −10.00 | −7.10 | −5.56 | −5.30 |
| 07 | −6.80 | −15.00 | −11.20 | −7.50 | −4.50 | −3.70 |
| 08 | −10.20 | −12.10 | −6.30 | −6.50 | −8.90 | −3.64 |
| 09 | −18.20 | −14.00 | −9.70 | −13.70 | — | −10.90 |
| 10 | −10.40 | −10.20 | — | −13.60 | −13.90 | −25.00 |
| 11 | −2.14 | −5.90 | −2.92 | −0.50 | 0.00 | −1.50 |
| 12 | −2.40 | −4.40 | −2.44 | −2.95 | −5.70 | 0.00 |
| 13 | −16.10 | −9.00 | −8.00 | −12.75 | −18.00 | −8.60 |
| 14 | — | — | −24.70 | — | — | — |
| 15 | −24.20 | — | — | — | −13.60 | −18.10 |
| 16 | −5.20 | −2.10 | −5.80 | −2.54 | −5.90 | −5.80 |
| 17 | 0.00 | 0.00 | 0.00 | 0.00 | −4.90 | −0.60 |
| 18 | −6.00 | −6.80 | −7.70 | −10.36 | −8.20 | −3.30 |
| 19 | −19.00 | — | −13.50 | — | — | −9.80 |
| 20 | −10.36 | −4.40 | −7.93 | −7.96 | — | −12.30 |
| 21 | −2.30 | −0.36 | −2.95 | −7.90 | — | −8.70 |
| 22 | −4.10 | −6.20 | −5.43 | −6.10 | −10.16 | −6.45 |
| 23 | −27.10 | −17.00 | −9.00 | −13.80 | — | −6.00 |
| 24 | −11.10 | −10.10 | −17.00 | — | — | — |
| 25 | −8.10 | −6.20 | −10.00 | −13.60 | — | −16.30 |
| 26 | −12.10 | −9.50 | — | −11.00 | — | −13.00 |
| 27 | — | — | — | — | — | — |
| 28 | −19.00 | — | — | — | — | −31.00 |
| 29 | −13.00 | −10.70 | — | — | — | −23.50 |
| 30 | — | −13.50 | — | — | — | — |

TABLE II

| | Spot 20 Global | Spot 21 Spain | Spot 22 France | Spot 23 Italy | Spot 24 Greece | Spot 25 Scandinavia |
|---|---|---|---|---|---|---|
| Final performance | 27.0 | 32.00 | 32.10 | 32.05 | 32.10 | 32.05 |
| Nominal performance | 27.50 | 32.30 | 32.40 | 32.25 | 32.25 | 32.25 |

TABLE III

| Distribution | \multicolumn{12}{c}{Radiating elements} | Total continuous power |

| Distribution | 01 | 02 | 03 | 04 | 05 | 06 | 07 | 08 | 09 | 10 | 11 | 12 | Total continuous power |
|---|---|---|---|---|---|---|---|---|---|---|---|---|---|
| 1 | 4.11 | 4.58 | 4.93 | 1.20 | 3.51 | 5.48 | 2.16 | 8.37 | 1.32 | 0.89 | 37.18 | 25.67 | 435 W |
| 2 | 4.30 | 4.60 | 5.35 | 1.75 | 4.61 | 5.65 | 2.39 | 8.68 | 1.79 | 1.54 | 34.46 | 23.70 | 434.7 W |
| 3 | 4.41 | 4.51 | 3.63 | 0.62 | 2.92 | 5.86 | 2.05 | 8.66 | 0.76 | 0.71 | 37.72 | 27.98 | 433.5 W |
| 4 | 3.49 | 4.12 | 4.81 | 1.90 | 3.30 | 5.42 | 2.30 | 9.93 | 1.27 | 1.28 | 36.37 | 25.90 | 435.8 W |
| 5 | 3.73 | 4.83 | 5.01 | 1.27 | 4.43 | 5.00 | 2.40 | 8.61 | 0.90 | 0.68 | 38.05 | 25.00 | 435 W |
| 6 | 5.49 | 5.97 | 4.68 | 0.85 | 4.60 | 5.48 | 1.72 | 6.71 | 1.16 | 0.35 | 39.70 | 23.30 | 436.1 W |
| 7 | 3.40 | 5.85 | 6.52 | 1.40 | 2.37 | 5.62 | 2.37 | 7.97 | 2.35 | 1.44 | 34.67 | 26.20 | 437.2 W |

I claim:

1. A satellite antenna system comprising:
   an array (10) of radiating elements preceded by an amplification stage (17);
   an optical focusing system (11);
   wherein said satellite antenna system serves a plurality of coverage zones with a plurality of beams formed by said radiating elements of said array and said optical focusing system, wherein said optical focusing system is arranged to generate optical aberrations;
   said array includes a predetermined number of high level radiating elements, said high level radiating elements being common to all of said coverage zones and continuously operating at a high power level for each of said plurality of coverage zones, said array further includes additional radiating elements which provide for a finer synthesis of coverage for each of said plurality of coverage zones, said additional radiating elements operating at levels which are lower than said high power level of each of said high level radiating elements;
   wherein each of said plurality of beams is formed by the excitation of a subset of said radiating elements of said array.

2. The satellite antenna system according to claim 1, wherein a dynamic range of amplitude excursion between said plurality of beams radiated by said high level radiating elements is limited in the order of 6 dB.

3. The satellite antenna system according to claim 1, wherein said radiating elements which have the same amplitude and phase variations for more than one coverage zone are controlled in accordance with a single control point.

4. The satellite antenna system according to claim 1, wherein said radiating elements contributing little to the synthesis of a coverage zone are ignored.

5. The satellite antenna system according to claim 1, wherein said aberrations are generated by providing said optical focusing system with a very small focal length/diameter ratio.

6. The satellite antenna system according to claim 1, wherein said aberrations are generated by depointing a boresight axis of said satellite antenna system relative to the direction of a set of coverage zones.

7. The satellite antenna system according to claim 1, wherein said aberrations are generated by the use of offset antenna configurations with a very high offset angle which lies in a range between 60° C. to 90°.

* * * * *